United States Patent
Yamada

(10) Patent No.: US 11,491,814 B2
(45) Date of Patent: Nov. 8, 2022

(54) DISPLAY BODY

(71) Applicant: TOPPAN PRINTING CO., LTD., Tokyo (JP)

(72) Inventor: Shizuka Yamada, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 600 days.

(21) Appl. No.: 16/514,884

(22) Filed: Jul. 17, 2019

(65) Prior Publication Data

US 2019/0337321 A1 Nov. 7, 2019

Related U.S. Application Data

(63) Continuation of application No. PCT/JP2018/001638, filed on Jan. 19, 2018.

(30) Foreign Application Priority Data

Jan. 19, 2017 (JP) .............................. JP2017-007740

(51) Int. Cl.
  *G03H 1/00* (2006.01)
  *B42D 25/328* (2014.01)
  (Continued)

(52) U.S. Cl.
  CPC ........... *B42D 25/328* (2014.10); *B42D 25/23* (2014.10); *B42D 25/333* (2014.10);
  (Continued)

(58) Field of Classification Search
  CPC .... B42D 25/328; B42D 25/373; B42D 25/23; B42D 25/333; G03H 1/0011;
  (Continued)

(56) References Cited

U.S. PATENT DOCUMENTS 7,551,335 B2 * 6/2009 Schilling .............. B42D 25/328
                                                              359/2
9,827,802 B2 * 11/2017 Fuhse .................. B42D 25/373
(Continued)

FOREIGN PATENT DOCUMENTS

CA    2 966 715 A1   5/2016
JP    2006-507526 A  3/2006
(Continued)

OTHER PUBLICATIONS

Notice of Reasons for Refusal for Japanese Patent Application No. JP 2017-007740, dated Feb. 2, 2021, with translation, 16 pages.
(Continued)

*Primary Examiner* — Audrey Y Chang
(74) *Attorney, Agent, or Firm* — Squire Patton Boggs (US) LLP

(57) ABSTRACT

A prism layer has an uneven surface that includes at least one display region. An interface layer is adjacent to the uneven surface. The interface layer has a difference in refractive index from the prism layer such that a refractive index of a side of an interface between the uneven surface and the interface layer at which the prism layer is located is higher than a refractive index of a side of the interface at which the light interference layer is located. The display region includes inclination elements. The inclination elements adjacent to each other in an array direction contact each other in a plan view facing a plane along which the prism layer expands. The inclination elements include first inclination elements among which the inclination angle increases by the even angles along the array direction.

7 Claims, 7 Drawing Sheets

(51) Int. Cl.
*B42D 25/23* (2014.01)
*B42D 25/333* (2014.01)

(52) U.S. Cl.
CPC ....... *G03H 1/0011* (2013.01); *G03H 2223/18* (2013.01); *G03H 2223/23* (2013.01)

(58) Field of Classification Search
CPC ........... G03H 2223/18; G03H 2223/23; G02B 5/045; G09F 19/14
USPC .............................................................. 359/2
See application file for complete search history.

(56) References Cited

U.S. PATENT DOCUMENTS

| | | | | |
|---|---|---|---|---|
| 10,124,621 | B2* | 11/2018 | Fuhse | B42D 25/373 |
| 2002/0163678 | A1* | 11/2002 | Haines | G03H 1/041 |
| | | | | 359/10 |
| 2006/0072225 | A1 | 4/2006 | Schilling et al. | |
| 2008/0259456 | A1 | 10/2008 | Schilling et al. | |
| 2014/0307321 | A1 | 10/2014 | Schilling et al. | |
| 2017/0334232 | A1* | 11/2017 | Yashiki | B42D 25/328 |

FOREIGN PATENT DOCUMENTS

| | | |
|---|---|---|
| JP | 2008-547040 A | 12/2008 |
| JP | 2009-271119 A | 11/2009 |
| JP | 2010-256688 A | 11/2010 |
| JP | 2011-218620 A | 11/2011 |
| WO | WO 2004/049250 A1 | 6/2004 |
| WO | WO 2016/075928 A1 | 5/2016 |

OTHER PUBLICATIONS

Supplementary European Search Report for European Application No. 18741286.1, 11 pages, Supplementary Search Report dated Oct. 9, 2020.

* cited by examiner

DISPLAY BODY

BACKGROUND

The present disclosure relates to a display body.

Various articles such as authentication documents, valuable securities, and paper currencies is required difficulty of counterfeiting of the articles. As an exemplary technology that make counterfeiting the articles be difficult, there has been used a technology adding an element to the articles that make difficult to be counterfeited and is able to display a given image (see Japanese National Phase Laid-Open Patent Publication No. 2008-547040, for example).

A technology for analyzing the above-described display body has evolved to develop the construction in which the counterfeiting is difficult. In addition, a technology for manufacturing the display body has been increasingly diversified to embody the construction in which the counterfeiting is difficult. However, the improvement in the technology for analyzing the display body facilitates the analysis of the display body for the purpose of the counterfeiting of the display body, and the diversification of the technology for manufacturing the display body facilitates the manufacture of counterfeited articles. Hence, for each element constituting the display body, a novel structure is more strongly desired than ever before, and particularly, a technology for enhancing the design of the display body is demanded.

SUMMARY

The present disclosure has an object to provide a display body that makes it possible to enhance the design of the display body.

To achieve the foregoing objective, a display body includes a light interference layer includes: a light interference layer that incident light enters at an incidence angle and that emerge reflected light, the incident light having a certain wavelength range, the reflected light having a given wavelength which is a part of the certain wavelength range, the given wavelength according to the incidence angle; a prism layer having optical transparency that transmits the incident light to the light interference layer, the prism layer having an uneven surface that includes at least one display region; and an interface layer that is next to the uneven surface, the interface layer having a difference refractive index from the prism layer such that a refractive index of the prism layer locating side of an interface of the uneven surface is higher than a refractive index of the light interference layer locating side of the interface. The display region includes a plurality of inclination elements. The inclination elements are inclined at specified angles with respect to a plane along that the prism layer expand. The inclination elements are arrayed in an array direction along the arrangement axis on the plane and elongating in an elongate direction along the longitudinal axis orthogonal to the array axis on the plane. The inclination elements next to each other in the array direction contact each other in a plan view facing the plane. The inclination elements include a plurality of first inclination elements among which the inclination angle increases by the even angles along the array direction.

To achieve the foregoing objective, a display body includes: a light interference layer that incident light enters at an incidence angle and that emerge reflected light, the incident light having a certain wavelength range, the reflected light having a given wavelength which is a part of the certain wavelength range, the given wavelength according to the incidence angle; and a prism layer having optical transparency transmits the incident light to the light interface layer, wherein one of a facing surface facing the light interference layer and an opposite surface being a side opposite to the facing surface of the prism layer is an uneven surface that includes at least one display region, the prism layer being constructed such that a refractive index of a side at which the incident light enters the uneven surface is higher than a refractive index of a side of the uneven surface at which the light interference layer is located. The display region has a shape in which a cross-section continues in one direction. The cross-section has a triangular wave shape in which triangular shapes are consecutively formed in an advance direction, and an inclination of a wave shape increases by the even angles along the advance direction.

The above configuration can occur a critical angle that is an incidence angle at which the incident light is refracted along the interface when the light enters the interface layer from the prism layer. Moreover, in the display region, the inclination angle continuously vary among the inclination elements, and by the angle fluctuation between a plane along which the display body extending and a plane containing a line-of-sight direction of an observer, the border between inclination elements for which the incidence angle of the incident light is larger than the critical angle and inclination elements for which the incidence angle of the incident light is smaller than the critical angle of the inclination elements continuously shifts in the array direction. Thereby, in the display region, the border between a portion that transmits the light reflected by the light interference layer and a portion that does not transmit the light reflected by the light interference layer continuously vary, and this enhance the artistry of the display body.

DESCRIPTION OF EXEMPLARY EMBODIMENTS

A display body substantiation of the embodiment will be described with reference to FIG. 1 to FIG. 14. The construction of the display body, the shape of a prism layer, the angles of inclination elements in the prism layer, the operation of the display body, a manufacturing method for the display body, and an example will be described below in order.

[Overall Construction of Display Body]

The overall construction of the display body will be described with reference to FIG. 1 to FIG. 3.

Figure 1:
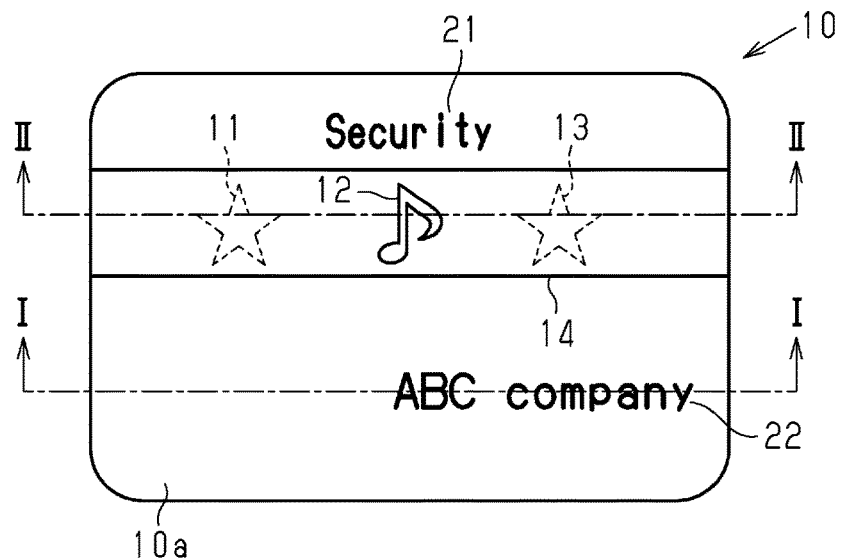
FIG. 1 is a plan view showing the structure of a display body according to an embodiment.

As shown in FIG. 1, a display body 10 has a rectangular plate shape, and the display body 10, for instance, is an ID card for authenticating an individual who possesses the display body 10. The display body 10 is constructed to able to display a first image 11, a second image 12, and a third image 13 with intervals along one direction in a plan view facing a surface 10a of the display body 10. The first image 11, the second image 12, and the third image 13 each only needs to have given shapes. The first image 11 and the third image 13 have a star shape, and the second image 12 has a shape expressing an eighth note. Further, the display body 10 has a band shape extending along a direction in which the first image 11, the second image 12, and the third image 13 are arrayed, and is constructed to able to display a fourth image 14 surrounding the first image 11, the second image 12, and the third image 13.

The display body 10 includes first information 21 and second information 22. The first information 21 and the second information 22 only needs to be configured, for instance, by characters, numerals and the like, and each of the first information 21 and the second information 22 is configured by a plurality of alphabets.

Figure 2:
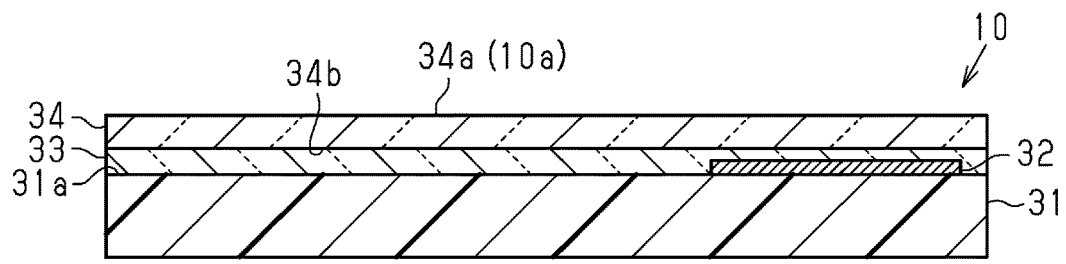
FIG. 2 is a cross-sectional view showing a structure along line I-I in FIG. 1.
Figure 3:
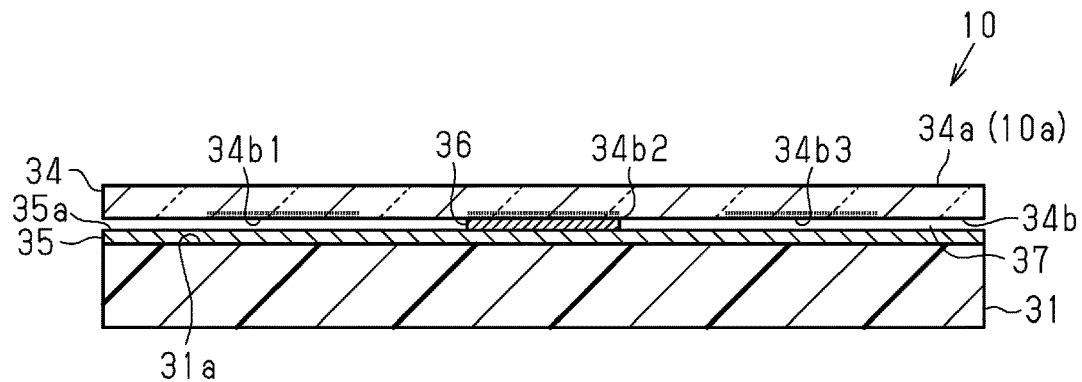
FIG. 3 is a cross-sectional view showing a structure along line II-II in FIG. 1.

FIG. 2 shows a cross-section structure of the display body 10 along line I-I in FIG. 1, and FIG. 3 shows a cross-section structure of the display body 10 along line II-II in FIG. 1.

As shown in FIG. 2, on the cross-section along line I-I, the display body 10 includes the base material 31, the print 32, the adhesion layer 33, and the prism layer 34. The print 32 is positioned on a part of a first base material surface 31a of the base material 31 that faces the prism layer 34. The print 32 includes the above-described second information 22. In FIG. 2, for convenience of illustration, the print 32 is expressed as one layer.

The prism layer 34 includes a first prism surface 34a that is the surface 10a of the display body 10, and a second prism surface 34b that is a surface on the side opposite to the first prism surface 34a. The first prism surface 34a is a surface that is substantially flat over the whole, and a portion on the second prism surface 34b that is contained in the cross-section along line I-I is substantially flat. The adhesion layer 33 bond the base material 31 and the prism layer 34 by filling the gap between the first base material surface 31a of the base material 31 and the second prism surface 34b of the prism layer 34.

The display body 10 has a shape that extends along one plane, and the prism layer 34 included in the display body 10 also has a same shape to the plane along which the display body 10 extends. The plane which the prism layer 34 extend can be regarded as being substantially parallel to the first prism surface 34a of the prism layer 34, that is, the surface 10a of the display body 10.

In the display body 10, the cross-section structure along the thickness direction of the display body 10 at a portion including the first information 21 has a layer structure equivalent to the cross-section structure along line I-I.

As shown in FIG. 3, on the cross-section along line II-II, the display body 10 includes the base material 31, the light interference layer 35, the print 36, and the prism layer 34. The second prism surface 34b of the prism layer 34 is an example of the uneven surface, and the second prism surface 34b includes the first display region 34b1, the second display region 34b2, and the third display region 34b3. In the prism layer 34, the second prism surface 34b is an instance of the facing surface that faces the light interference layer 35, and the first prism surface 34a is an instance of the opposite surface that is the surface on the side opposite to the facing surface. In the prism layer 34, the above-described uneven surface is one of the facing surface and the opposite surface.

On the cross-section along line II-II, that is, on the cross-section along the thickness direction of the display body 10, each of portions including the display regions has a saw-tooth shape. In FIG. 3, for convenience of illustration, each of the display regions is shown as dots.

The first display region 34b1 is positioned at a site that the first image 11 is displayed, the second display region 34b2 is positioned at a site that the second image 12 is displayed, and the third display region 34b3 is positioned at a site that the third image 13 is displayed, in a plan view facing the first prism surface 34a. That is, the first display region 34b1 is a region for displaying the first image 11, the second display region 34b2 is a region for displaying the second image 12, and the third display region 34b3 is a region for displaying the third image 13.

On the cross-section along line II-II, the light interference layer 35 is positioned over the whole of the first base material surface 31a of the base material 31. The light interference layer 35 only needs to be at least at a position that overlaps with each of the first display region 34b1 and the third display region 34b3, in a plan view facing the first prism surface 34a.

The light interference layer 35 reflects reflected light having a given wavelength that is a part of incident light (namely, a part of the certain wavelength range), by the light interference depending on the incidence angle of the incident light. In other words, the light interference layer 35 interferes and reflects the light that enters the light interference layer 35 at an incidence angle from the side at which the prism layer 34 is located, and thereby the light interference layer 35 emerges the light having a given wavelength as the reflected light. The light interference layer 35 may be one of a cholesteric liquid crystal layer and a multi-layer interference structure.

On a first light interference surface 35a of the light interference layer 35 that faces the prism layer 34, the print 36 is positioned at a site that overlaps with a second display region 34b2 on the second prism surface 34b. In FIG. 3, for expedience of illustration, the print 36 is expressed as one layer.

On the cross-section along line II-II, the adhesion layer 33 is not positioned between the first light interference surface 35a of the light interference layer 35 and the second prism surface 34b of the prism layer 34, unlike the cross-section along line I-I. Therefore, an air layer 37 is positioned between the first light interference surface 35a of the light interference layer 35 and the second prism surface 34b of the prism layer 34. The air layer 37 is an example of the interface layer having an interface with the second prism surface 34b of the prism layer 34.

The adhesion layer 33 may be positioned at portions other than the first display region 34b1, the second display region 34b2, and the third display region 34b3, in the gap between the first light interference surface 35a and the second prism surface 34b.

In the display body 10, a side of the prism layer 34 that is opposite to the light interference layer 35 is a side that the light enters, and is a side that is observed by an observer.

[Shape of Prism Layer]

Figure 4:
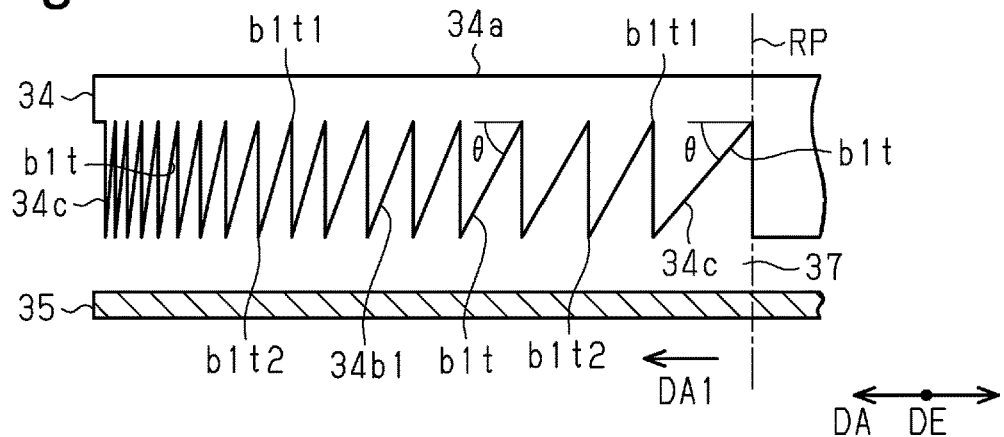
FIG. 4 is a partial enlarged cross-sectional view showing, in an enlarged manner, the structure of a first display region and the periphery in the embodiment.
Figure 5:
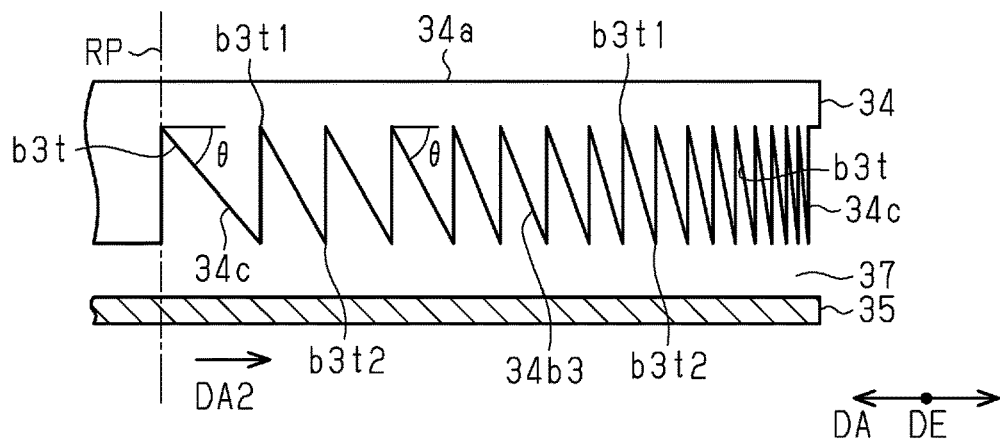
FIG. 5 is a partial enlarged cross-sectional view showing, in an enlarged manner, the structure of a third display region and the periphery in the embodiment.
Figure 6:
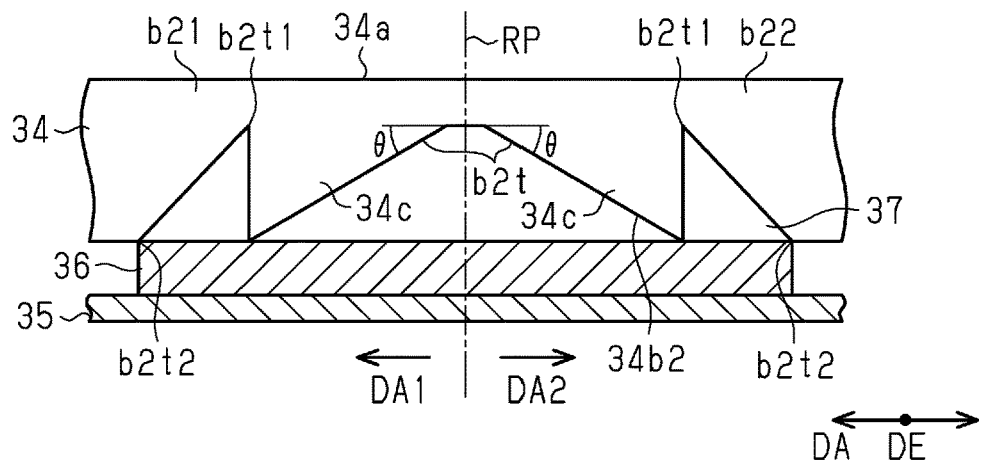
FIG. 6 is a partial enlarged cross-sectional view showing, in an enlarged manner, the structure of a second display region and the periphery in the embodiment.

The prism layer 34, the light interference layer 35, the print 36, and the air layer 37 will be described in more detail, with reference to FIG. 4 to FIG. 7. FIG. 4 shows only portions of the light interference layer 35 and the air layer 37 that overlap with the first display region 34b1 as viewed in the thickness direction of the display body 10. FIG. 5 shows only portions of the light interference layer 35 and the air layer 37 that overlap with the third display region 34b3 as viewed in the thickness direction of the display body 10. FIG. 6 shows only portions of the light interference layer 35, the print 36, and the air layer 37 that overlap with the second display region 34b2 as viewed in the thickness direction of the display body 10. In FIG. 4 to FIG. 7, hatchings of the prism layer 34 are omitted for making it easy to recognize the shape of the prism layer 34.

As shown in FIG. 4, the first display region 34b1 is an uneven surface including a plurality of first inclination elements b1t that are inclined at a given inclination angle θ with respect to a plane along which the prism layer 34 expands. The inclination elements b1t are arrayed in an array direction DA along an arrangement axis on the plane, and elongate in an elongating direction DE along a longitudinal axis orthogonal to the array axis on the plane. First inclination elements b1t next to each other in the array direction DA contact each other in a plan view facing the plane along which the prism layer 34 expand.

Among all the first inclination elements b1t included in the first display region 34b1, the inclination angle θ of the first inclination element b1t increases by the even angles along the array direction DA. In the first display region 34b1, the inclination angle θ of the first inclination element b1t increases along the array direction DA and along the direction from right to left on the sheet plane. It is preferable that the difference in the inclination angle θ between the first inclination elements b1t adjacent to each other in the array direction DA be 2° or smaller.

In other words, on the cross-section along the thickness direction of the display body 10, the first display region 34b1 has a shape in which a cross-section having a triangular wave shapes in which triangular shapes are consecutively formed in an advance direction continues in the one direction, and the inclinations of the wave shape increases by the even angles along the advance direction.

A plane orthogonal to the plane that is along the prism layer 34 extend and parallel plane to the extending direction DE is the reference plane RP. In the first display region 34b1, on the cross-section orthogonal to the prism layer 34 and parallel to the array direction DA, in other words, on the above-described cross-section along line II-II, all the first inclination elements b1t belonging to the first display region 34b1 are inclined in a first array direction DA1 along the arrangement axis with respect to the reference plane RP. As concrete, all the first inclination elements b1t are inclined in the direction from right to left on the drawing face.

An edge of each first inclination element b1t for which the distance from the first prism surface 34a is smaller in the thickness direction of the prism layer 34 is a base edge b1t1, and an edge of the distance from the first prism surface 34a for which the distance from the first prism surface 34a is larger is a distal e edge b1t2. It is preferable that the positions of the base edges b1t1 in the thickness direction of the prism layer 34 be equal to each other and the positions of the distal edges b1t2 be equal to each other among the first inclination elements b1t.

In other words, it is preferable that the prism layer 34 have a plurality of convex portions 34c each of which includes one first inclination element b1t different from the other first inclination elements b1t and the heights of the convex portions 34c be equal to each other in the thickness direction of the prism layer 34. Therefore, the width of the first inclination element b1t along the array direction DA in a plan view facing the first prism surface 34a, in other words, the width of the convex portion 34c along the array direction DA decreases as the inclination angle θ of the first inclination element b1t increases.

As shown in FIG. 5, similarly to the first display region 34b1, the third display region 34b3 is an uneven surface including third inclination elements b3t that are inclined at the given inclination angle θ with respect to the plane along which the prism layer 34 expands. The third inclination elements b3t are arrayed in the array direction DA, and extend along the longitudinal direction DE. Third inclination elements b3t next to each other in the array direction DA contact each other in a plan view facing the plane along which the prism layer 34 expands.

Among all the third inclination elements b3t included in the third display region 34b3, the inclination angle θ of the third inclination element b3t increases by the even angles along the array direction DA. In the third display region 34b3, the inclination angle θ of the third inclination element b3t increases along the array direction DA and along the direction from left to right on the sheet plane. It is preferable that the difference in the inclination angle θ between the third inclination elements b3t be 2° or smaller, and be the same as the difference in the inclination angle θ between the first inclination elements b1t in the first display region 34b1.

In other words, on the cross-section along the thickness direction of the display body 10, the third display region 34b3 has a shape in which a cross-section having a triangular wave shape in which triangular shapes are consecutively formed in an advance direction continues in one direction, and the inclination of the wave shape increases by the even angles along the advance direction.

In the third display region 34b3, on the cross-section along line II-II, all the third inclination elements b3t belonging to the third display region 34b3 are inclined in a second array direction DA2 opposite to the first array direction DA1 with respect to the reference plane RP. The above-described array direction DA is configured by the first array direction DA1 and the second array direction DA2. As concrete configuration, all the third inclination elements b3t are inclined in the direction from left to right on the sheet plane. Moreover, the third display region 34b3 has a relationship of plane symmetry with the first display region 34b1 when the reference plane RP is a symmetry plane. That is, a mirror-reversed shape of the third display region 34b3 is a shape that overlaps with the shape of the first display region 34b1, in other words, the same shape as the shape of the first display region 34b1.

In the third display region 34b3, similarly to the first display region 34b1, it is preferable that the positions of base edges b3t1 in the thickness direction of the prism layer 34 be equal to each other and the positions of distal edges b3t2 be equal to each other among the third inclination elements b3t. In other words, the heights of the convex portions 34c be preferably equal to each other. Therefore, the width of the third inclination element b3t along the array direction DA in a plan view facing the first prism surface 34a, in other words, the width of the convex portion 34c along the array direction DA increases with decreasing as the inclination angle θ of the third inclination element b3t.

In this configuration, when a plane containing a line-of-sight direction of an observer intersects the plane along which the display body 10 expands at an angle other than the perpendicular angle, it is possible to be greatly difference in the incidence angles for the inclination elements of the lights that are the incident lights to the inclination elements and for which the observer is able to visually recognize the reflected light, between the first display region 34b1 and the third display region 34b3.

As shown in FIG. 6, similarly to the first display region 34b1, the second display region 34b2 is an uneven surface including second inclination elements b2t that are inclined at the given inclination angle θ with respect to the plane along which the prism layer 34 expands. The second inclination elements b2t are arrayed in the array direction DA, and elongate along the longitudinal direction DE. Second inclination elements b2t next to each other in the array direction DA contact each other in a plan view facing the plane along which the prism layer 34 expands.

The second display region 34b2 is configured by a first portion b21 and a second portion b22 that are arrayed in the array direction DA. Each of the first portion b21 and the second portion b22 includes a plurality of second inclination elements b2t. In the second display region 34b2, on the cross-section along line II-II, all the second inclination elements b2t belonging to the first portion b21 are inclined in the first array direction DA1 with respect to the reference plane RP, and all the second inclination elements b2t belonging to the second portion b22 are inclined in the second array direction DA2 opposite to the first array direction DA1 with respect to the reference plane RP.

In other words, on the cross-section along the thickness direction of the display body 10, each of the first portion b21 and the second portion b22 has a shape in which a cross-section having a triangular wave shape in which triangular shapes are consecutively formed in an advance direction continuing in one direction, and the inclinations of the wave shapes increases by the even angles along the advance direction.

As concrete configuration, all the second inclination elements b2t belonging to the first portion b21 are inclined in the direction from right to left on the drawing face, and all the second inclination elements b2t belonging to the second portions b22 are inclined in the direction from left to right on the drawing face. Moreover, the first portion b21 has a relationship of plane symmetry with the second portion b22 when the reference plane RP is a symmetry plane. That is, a mirror-reversed shape of the first portion b21 is a shape that overlaps with the shape of the second portion b22, in other words, the same shape as the shape of the second portion b22.

In the second display region 34b2, similarly to the first display region 34b1, it is preferable that the positions of base end portions b2t1 in the thickness direction of the prism layer 34 be preferably equal to each other and the positions of distal edges b2t2 be preferably equal to each other among the second inclination elements b2t. In other words, the heights of the convex portions 34c be preferably equal to each other. Therefore, the width of the second inclination element b2t along the array direction DA in a plan view facing the first prism surface 34a, in other words, the width of the convex portion 34c increases along with the array direction DA decreasing as the inclination angle θ of the second inclination element b2t.

According to the second display region 34b2, when a plane containing a line-of-sight direction intersects the plane along which the display body 10 expands at an angle other than the perpendicular angle, it is possible to be greatly varying in the incidence angles for the inclination elements of the lights that are the incident lights to the second inclination element b2t and for which the observer can visually recognize the reflected lights, compared to configuration in which the inclination directions of the second inclination elements are the same. Therefore, it is possible to form two portions different in state, in an image that is formed on one second display region 34b2, and further, it is possible to enhance the artistry of the display body 10.

Figure 7:
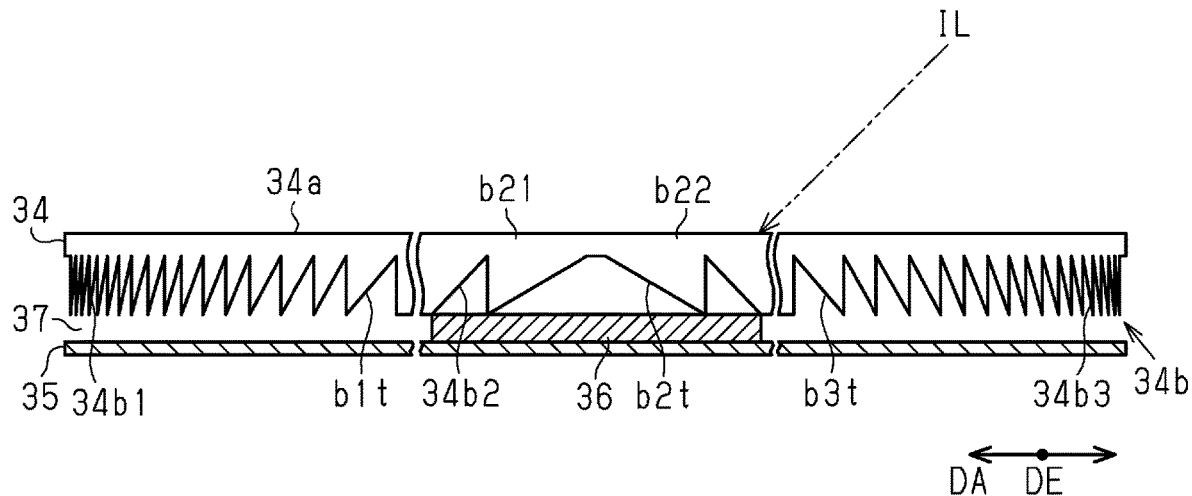
FIG. 7 is an enlarged cross-sectional view showing, in an enlarged manner, the structure of a prism layer, a print, and a light interference layer in the embodiment.

As shown in FIG. 7, the prism layer 34 is positioned so as to be closer to the side that incident light IL enters, than the light interference layer 35 is. That is, the incident light IL enters the light interference layer 35 after being transmitted by the prism layer 34. As described above, the prism layer 34 has the second prism surface 34b including the three display regions. The prism layer 34 has a light transmission property, and transmits the incident light IL to the light interference layer 35. As the formation material for the prism layer 34, a variety of resins can be applied.

The air layer 37, which is adjacent to the second prism surface 34b, forms an interface between the air layer 37 and the second prism surface 34b, and forms a difference in refractive index from the prism layer 34 such that the refractive index of a first side at which the incident light enters the interface is higher than the refractive index of a second side of the interface at which the light interference layer 35 is positioned.

The air layer 37 is a layer that is formed by air, and therefore the refractive index of the air layer 37 is about 1. On the other hand, the prism layer 34 is a layer that is formed from a variety of resins as described above, and therefore the refractive index of the prism layer 34 is in a range of 1.3 or higher and 1.8 or lower, for instance. Hence, due to the air layer 37, the refractive index of the first side, in other words, the prism layer 34 is higher than the refractive index of the second side, in other words, the air layer 37. That is, the prism layer 34 is configured such that the refractive index of the first side is higher than the refractive index of the second side.

The second prism surface 34b of the prism layer 34 includes a plurality of display regions that are arrayed at intervals in the array direction DA. As described above, the second prism surface 34b includes the first display region 34b1, the second display region 34b2, and the third display region 34b3 that are arrayed at intervals in the array direction DA. In the three display regions, between display regions adjacent to each other, each display region includes a portion where the inclination angle θ of the inclination element increases by the even angles along the array direction DA.

More specifically, the first display region 34b1 and the first portion b21 of the second display region 34b2 are adjacent to each other in the array direction DA. As described above, the inclination angles θ of respective inclination elements varies by the even angles, among the second inclination elements b2t belonging to the first portion b21 of the second display region 34b2 and among the first inclination element b1t belonging to the first display region 34b1. Further, the difference between the inclination angle θ of the second inclination element b2t closest to the first display region 34b1 in the array direction DA and the inclination angle θ of the first inclination element b1t closest to the second display region 34b2 in the array direction DA is equal to the difference in the inclination angle θ between inclination elements adjacent to each other in each display region.

As described above, the inclination angles θ of respective inclination elements varies by the even angles among the second inclination elements b2t belonging to the second portion b22 of the second display region 34b2 and among the third inclination elements b3t belonging to the third display region 34b3. Further, the difference between the inclination angle θ of the second inclination element b2t closest to the third display region 34b3 in the array direction DA and the inclination angle θ of the third inclination element b3t closest to the second display region 34b2 is equal to the difference in the inclination angle θ between inclination elements adjacent to each other in each display region.

The second prism surface 34b of the prism layer 34 may include a plurality of portions having a function to condense the light that enters the second prism surface 34b. By using this configuration, in a region where the incident light having an incidence angle exceeding a critical angle is totally reflected, the light scatters, and the function to condense the light is not exerted. In contrast, in a region where the incident light having an incidence angle smaller than the critical angle is transmitted, the function to condense the incident light is exerted.

The prism layer 34 may include the above-described prism layer 34 as a first layer, and may include a second layer having a shape along the second prism surface 34b of the first layer, at the interface with the air layer 37. In this case, the difference between the refractive index of the second layer and the refractive index of the first layer and the difference between the refractive index of the second layer and the refractive index of the air layer 37 preferably should be within ±0.2, and more preferably should be within ±0.1.

When the difference in refractive index between two layers falls within such a range, it is possible to restrain the reflection of the light on the interface between the first layer and the second layer and on the interface between the air layer 37 and the second layer. The second layer have a function to enhance the tolerance of the first layer and a function to compensate an uneven shape on the first layer preferably. The second layer may be formed on the first layer, applying a dry coating method, a wet coating method, or the like.

[Angle of Each Inclination Element]

The angle of each inclination element of the prism layer 34 will be described with reference to FIG. 8 to FIG. 11. In the following, a principle used in the display body 10 will be described before the description of the angle of each inclination element.

[Principle Used in Display Body]

Figure 8:
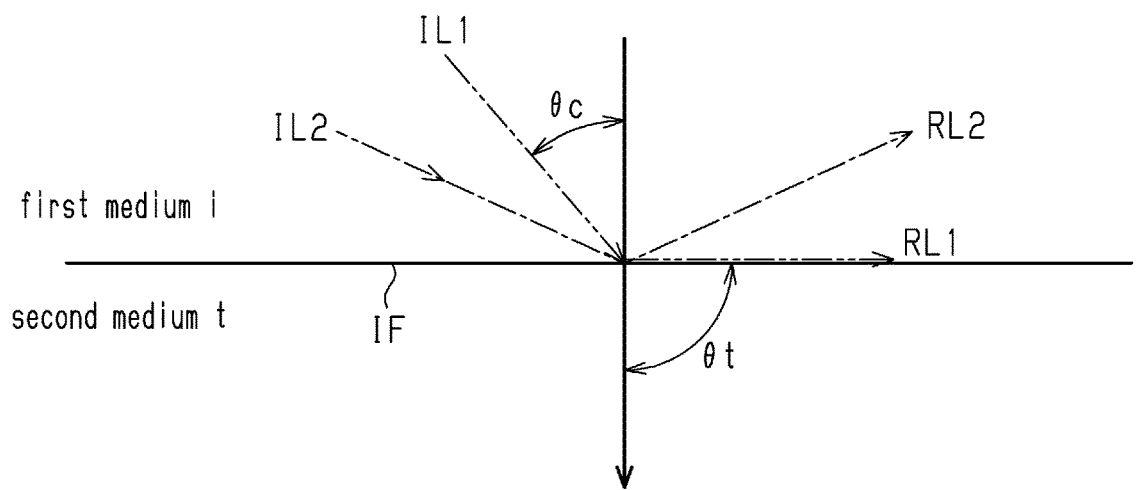
FIG. 8 is a schematic view for describing a principle that is used in the display body.

The principle used in the display body 10 will be described with used of FIG. 8. As shown in FIG. 8, a first medium i and a second medium t have a horizontal interface IF. The refractive index of the first medium i is a first refractive index ni, and the refractive index of the second medium t is a second refractive index nt. In this construction, a critical angle θc can be evaluated by Expression 1 shown below, based on the Snell's law and the definition of the refractive index.

$$\sin\theta c = nt/ni \qquad \text{(Expression 1)}$$

For a first incident light IL1 that enters the interface IF at the critical angle θc, a refractive angle θt at the interface IF is 90°. In other words, the first incident light IL1 is refracted along the interface IF between the first medium i and the second medium t, and is emerged as a refracted light RL1. A second incident light IL2 that enters the interface IF at a larger angle than the critical angle θc is totally reflected by the interface IF, and is emerged as reflected light RL2. Incident light that enters the interface IF at a smaller angle than the critical angle θc is refracted at a refractive angle according to the Snell's law, by the interface IF, and is transmitted by the interface IF.

The intensity of the reflected light at the interface IF fluctuate depending on the incidence angle of the incident light. In a range in which the incidence angle of the incident light is smaller than the critical angle θc, as the incidence angle of the incident light increases toward the critical angle θc, the path of the refracted light to be transmitted by the second medium t becomes closer to a direction along the interface IF, and the intensity of the refracted light decreases. In contrast, in a range in which the incidence angle of the incident light is smaller than the critical angle θc, as the incidence angle of the incident light increases toward the critical angle θc, the intensity of the reflected light increases, and when the incidence angle exceeds the critical angle θc, all of the incident light is reflected by the interface IF.

Further, in the above-described configuration including the prism layer 34, for the light totally reflected by the interface between the prism layer 34 and the air layer 37, the reflection, the transmission, and the refraction are further iterated by the convex portion 34c included in the prism layer 34 and the surface of the prism layer 34, and thereby the intensity decreases. Therefore, the above-described total reflection may mean only the total reflection by the interface between the prism layer 34 and the air layer 37, or may include a case where the intensity of the light decreases due to the reflection, transmission, refraction, and scattering after the total reflection. Multiple reflections, transmissions, and refractions at the interface between the prism layer 34 and the air layer 37 can be regarded as the scattering of the light in a plurality of directions, and therefore the shape of the prism layer 34 may be designed for the purpose of such scattering.

A necessary condition for the occurrence of the total reflection at an incidence angle exceeding the critical angle θc is that the first refractive index ni is higher than the second refractive index nt (ni>nt). That is, at the interface IF between the first medium i and the second medium t that are different in refractive index, the light that enters the second medium t from the first medium i is totally reflected at an incidence angle exceeding the critical angle θc. In contrast, for the incidence angle of the light that enters the first medium i from the second medium t, there is no critical angle θc.

[Inclination Angle of Inclination Element]

Figure 9:
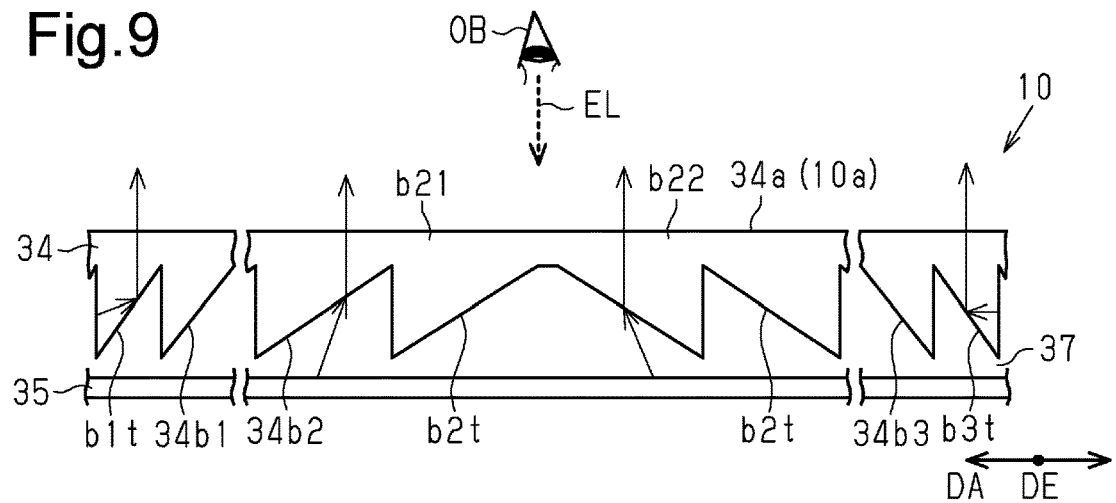
FIG. 9 is a light path diagram for illustrating a light path of the light to enter each display region when the display body in the embodiment is viewed from a first observation point.
Figure 10:
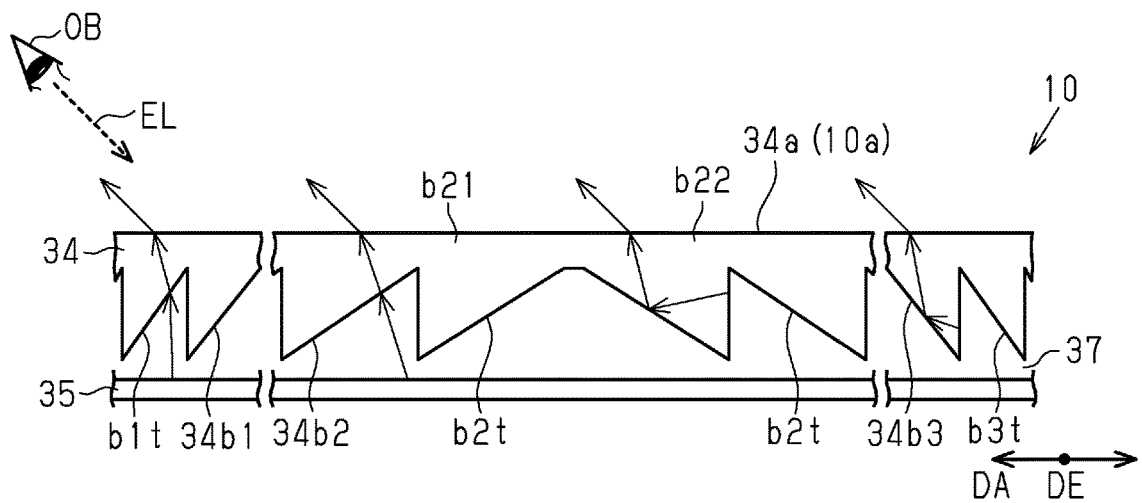
FIG. 10 is a light path diagram for illustrating a light path of the light to enter each display region when the display body in the embodiment is viewed from a second observation point.
Figure 11:
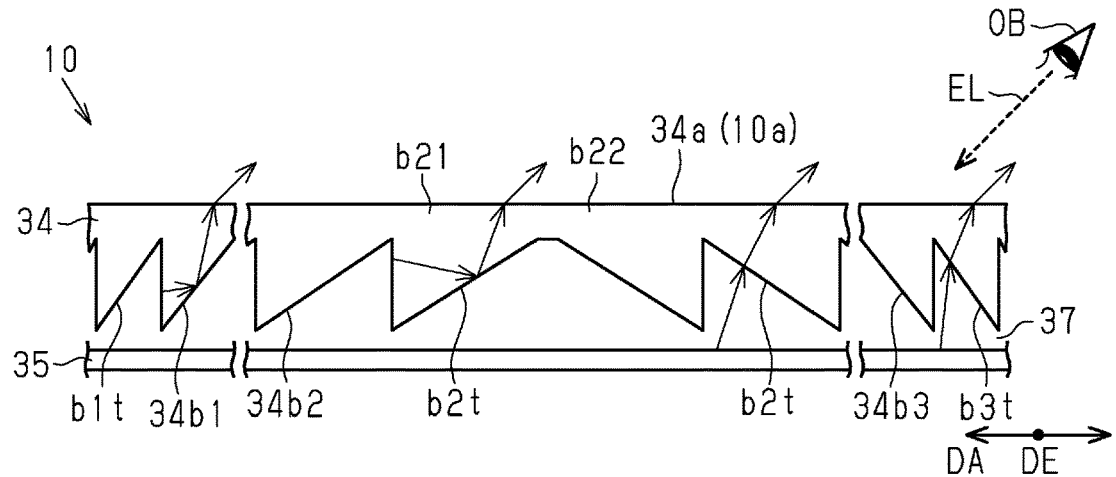
FIG. 11 is a light path diagram for illustrating a light path of the light to enter each display region when the display body in the embodiment is viewed from a third observation point.

The inclination angle θ of the inclination element will be described with reference to FIG. 9 to FIG. 11. In FIG. 9 to FIG. 11, for expedience of illustration, only some of the first inclination elements b1t included in the first display region 34b1 are shown, and only some of the third inclination elements b3t included in the third display region 34b3 are shown. Further, in FIG. 9 to FIG. 11, the illustration of the print 36 positioned at a site facing the second display region 34b2 is omitted.

[First Observation Point]

As shown in FIG. 9, when an observer OB observes the display body 10 from a first observation point, a surface 10a of the display body 10 and a first plane containing a line-of-sight direction EL of the observer OB intersects perpendicularly. At this time, the incident light enters all the second inclination elements b2t, at smaller incidence angles than the critical angle θc. Therefore, at least some of the incident light that enters the second inclination elements b2t is transmitted by the air layer 37, and reaches the light interference layer 35. Hence, the observer OB can visually recognize the light that is the reflected light emerged from the light interference layer 35 and that is transmitted by the second display region 34b2.

In contrast, the incident light enters all the first inclination elements b1t and all the third inclination elements b3t, at larger incident angles than the critical angle θc.

Thus, the lights that enters the first inclination elements b1t and the third inclination elements b3t are totally reflected by the inclination elements, is reflected multiple times in the interior of the prism layer 34, and are emerged from the prism layer 34 toward the observer OB. Therefore, the observer OB cannot visually recognize the light that is the reflected light emerged from the light interference layer 35 and that is transmitted by the first display region 34b1 or the third display region 34b3.

Thus, the display body 10 is configured such that the inclination angle of each inclination element continuously varies along the array direction DA in the range that the lights enters the second inclination elements b2t at smaller angles than the critical angle θc and the lights enters the first inclination element b1t and the third inclination element b3t at larger angles than the critical angle θc, when the display body 10 is observed from the first observation point.

[Second Observation Point]

As shown in FIG. 10, when the observer OB observes the display body 10 from a second observation point, the angle to be formed by the surface 10a of the display body 10 and a second plane containing the line-of-sight direction EL of the observer OB is 45°.

At this, the incident light enters all the first inclination elements b1t and all the second inclination elements b2t that belong to the first portion b21, at smaller incidence angle than the critical angle θc. Therefore, at least some of the incident light that enters the inclination elements is transmitted by the air layer 37 and reaches the light interference layer 35. Hence, the observer OB can visually recognize the light that is the reflected light emerged from the light interference layer 35 and that is transmitted by the first display region 34b1 or is transmitted by the first portion b21 of the second display region 34b2.

Moreover, the inclination angle θ of the first inclination element b1t is constructed such that the light that has a part of the wavelengths included in the reflected light at the time of the reflection by the light interference layer 35 and that has a given interference color is emerged from the prism layer 34. In contrast, the inclination angle θ of the second inclination element b2t belonging to the first portion b21 is constructed such that the light that has a part of the wavelengths included in the reflected light at the time of the reflection by the light interference layer 35 and that has a different interference color from that of the light transmitted by the first display region 34b1 is emerged from the prism layer 34. Therefore, in the light that is emerged from the prism layer 34, the light transmitted by the first display region 34b1 has a different color from that of the light transmitted by the first portion b21 of the second display region 34b2.

In contrast, the incident light enters all the second inclination elements b2t that belong to the second portion b22 and all the third inclination element b3t at larger incidence angle than the critical angle θc. Therefore, the incident light that enters the inclination elements is totally reflected by the inclination elements, is reflected multiple times in the interior of the prism layer 34, and is emerged from the prism layer 34 toward the observer OB. Therefore, the observer OB cannot visually recognize the light that is the reflected light emerged from the light interference layer 35 and that is transmitted by the second portion b22 of the second display region 34b2 or is transmitted by the third display region 34b3.

Thus, the display body 10 is constructed such that the inclination angle of each inclination element continuously varies along the array direction DA, in a range in which the light enters the first inclination elements b1t and the second inclination elements b2t belonging to the first portion b21 at smaller angles than the critical angle θc, when the display body 10 is observed from the second observation point. Further, the display body 10 is configured such that the inclination angle of each inclination element continuously varies along the array direction DA, in a range in which the light enters the second inclination elements b2t belonging to the second portion b22 and the third inclination elements b3t at larger angles than the critical angle θc, when the display body 10 is observed from the second observation point.

[Third Observation Point]

As shown in FIG. 11, when the observer OB observes the display body 10 from a third observation point, the angle to be formed by the surface 10a of the display body 10 and a third plane containing the line-of-sight direction EL of the observer OB is 45°. The third plane has a relationship of plane symmetry with the second plain with respect to a plane orthogonal to the surface 10a of the display body 10 and parallel to the elongate direction DE.

At this time, the incident light enters all the third inclination elements b3t and all the second inclination elements b2t that belong to the second portion b22, at smaller incidence angles than the critical angle θc. Therefore, at least some of the incident light that enters the inclination elements is transmitted by the air layer 37 and reaches the light interference layer 35. Hence, the observer OB can visually recognize the light that is the reflected light emerged from the light interference layer 35 and that is transmitted by the third display region 34b3 or is transmitted by the second portion b22 of the second display region 34b2.

Moreover, the inclination angle θ of the third inclination element b3t is configured such that the light that has a part of the wavelengths included in the reflected light at the reflection by the light interference layer 35 and that has the given interference color is emerged from the prism layer 34.

In contrast, the inclination angle θ of the second inclination element b2t belonging to the second portion b22 is configured such that the light having a part of the wavelengths included in the reflected light at the reflection by the light interference layer 35 and that has a different interference color from that of the light transmitted by the third display region 34b3 which is emerged from the prism layer 34. Therefore, in the light that is emerged from the prism layer 34, the light transmitted by the third display region 34b3 has a different color from that of the light transmitted by the second portion b22 of the second display region 34b2.

In contrast, the incident light enters all the second inclination elements b2t that belong to the first portion b21 and all the first inclination elements b1t at larger incidence angles than the critical angle θc. Therefore, the incident light that enters the inclination elements is totally reflected by the inclination elements, is reflected multiple times in the interior of the prism layer 34 and is emerged from the prism layer 34 toward the observer OB. Therefore, the observer OB cannot visually recognize the light that is the reflected light emarged from the light interference layer 35 and that is transmitted by the first portion b21 of the second display region 34b2 or is transmitted by the first display region 34b1.

Thus, the display body 10 is constructed such that the inclination angle of each inclination element continuously varies along the array direction DA, in a range in which the light enters the third inclination elements b3t and the second inclination elements b2t belonging to the second portion b22 at smaller angles than the critical angle θc, when the display body 10 is observed from the third observation point. Further, the display body 10 is configured such that the inclination angle of each inclination element continuously varied along the array direction DA, in a range in which the light enters the second inclination elements b2t belonging to the first portion b21 and the first inclination elements b1t at larger angles than the critical angle θc, when the display body 10 is observed from the third observation point.

In the display body 10, the inclination angle of the inclination element included in each display region continuously varies, and thereby, it is possible to display an image that is formed by the light transmitted by the inclination elements and an image that is formed by the lights totally reflected by the inclination elements, when the display body 10 is visually recognized from each observation point. Moreover, since the inclination angle of the inclination element continuously varies, it is possible to smoothly shift the border between the image that is formed by the light transmitted by the inclination elements and the image that is formed by the light totally reflected by the inclination elements, by continuously varying the angle to be formed by the surface 10a of the display body 10 and the plane containing the line-of-sight direction EL.

Further, the image that is formed by the lights transmitted by the inclination elements is also an image that is formed by the lights reflected by the light interference layer 35, and the incidence angle of the light to the light interference layer 35 differs for respective the inclination elements transmitting the lights, depending on the difference in inclination angles among the inclination elements. Therefore, it is possible to continuously vary the color of the image to be displayed on each display region, along the array direction DA, by varying the angle to be formed by the surface 10a of the display body 10 and the plane containing the line-of-sight direction EL.

The necessary parameters for each display region can be expressed using the incidence angle to the inclination element belonging to each display region, the refractive index of the prism layer 34, the refractive index of the air layer 37, and the critical angle θc to be obtained from the ratio of the refractive index of the prism layer 34 and the refractive index of the air layer 37. That is, the inclination angle in a display region where the incident light that enters the inclination element is totally reflected is represented as an inclination angle θ1, the incidence angle of the light to the inclination element in this display region is represented as an incidence angle θf1, the inclination angle in a display region where the light that enters the inclination element is refracted and transmitted is represented as an inclination angle θ2, and the incidence angle of the light that enters this display region is represented as an incidence angle θf2. Further, when the refractive index of the prism layer 34 is represented as a refractive index N1 and the refractive index of the air layer 37 is represented as a refractive index N2, the necessary condition for each display region can be expressed as Expression 2 shown below.

$$\theta f1\ \mathrm{arcsin}(N2/N1) > \theta f2 \quad \text{(Expression 2)}$$

In the case where the refractive index of the prism layer 34 differs between the display region where the incident light is totally reflected and the display region where the incident light is transmitted, the necessary condition for each display region can be expressed as Expression 3 and Expression 4 shown below. In the following, the refractive index of the prism layer 34 in the display region where the incident light is totally reflected is represented as a refractive index N1, the refractive index of the air layer 37 is represented as a refractive index N2, the refractive index of the prism layer 34 in the display region where the incident light is transmitted is represented as a refractive index N3, and the refractive index of the air layer 37 in the display region where the incident light is transmitted is represented as a refractive index N4.

$$\theta f1 \geq \mathrm{arcsin}(N2/N1) \quad \text{(Expression 3)}$$

$$\mathrm{arcsin}\ (N4/N3) > \theta f2 \quad \text{(Expression 4)}$$

Thus, it is possible to determine whether the incident light that enters each display region is totally reflected or transmitted in the display region, with the three parameters belonging to the display body 10, that is, the inclination angle of each inclination element, the refractive index of the prism layer 34, and the refractive index of the air layer 37.

[Operation of Display Body]

The operation of the display body 10 will be described with reference to FIG. 12 to FIG. 14.

Figure 12:
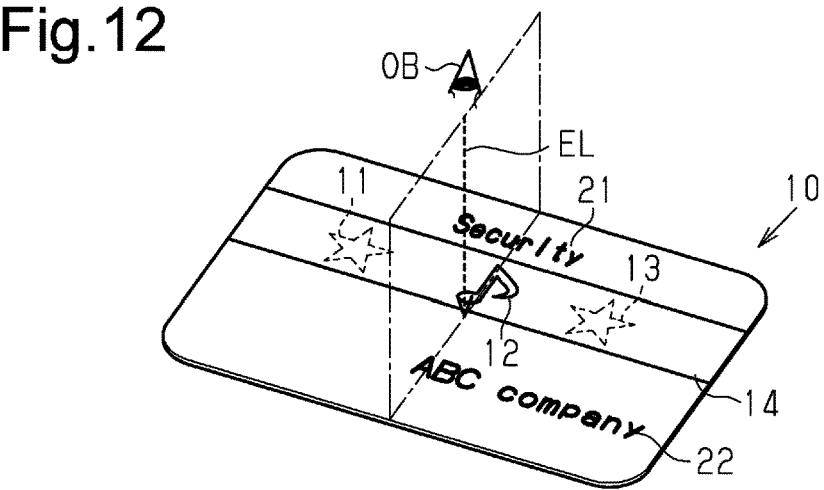
FIG. 12 is a phenomenon diagram for illustrating the working of the display body when the display body in the embodiment is viewed from the first observation point.

As shown in FIG. 12, when the observer OB observes the display body 10 from the first observation, the light that enters the first display region 34b1 and the third display region 34b3 is totally reflected by the inclination elements belonging to the display regions, and therefore the first image 11 with white color and the third image 13 with white color are displayed. In contrast, the light that enters the second display region 34b2 is transmitted by the second inclination elements b2t, and therefore the second image 12 corresponding to the color of the print 36 is displayed. For example, when the print 36 has black color, the second image 12 with black color is displayed.

The fourth image 14 with a color derived from the light emerged by the light interference layer 35 is formed at a site that is in a region where the light interference layer 35 is positioned in a plan view facing the surface 10a of the display body 10 and that does not overlap with the first display region 34b1, the second display region 34b2, and the third display region 34b3 as viewed from the thickness direction of the display body 10.

Figure 13:
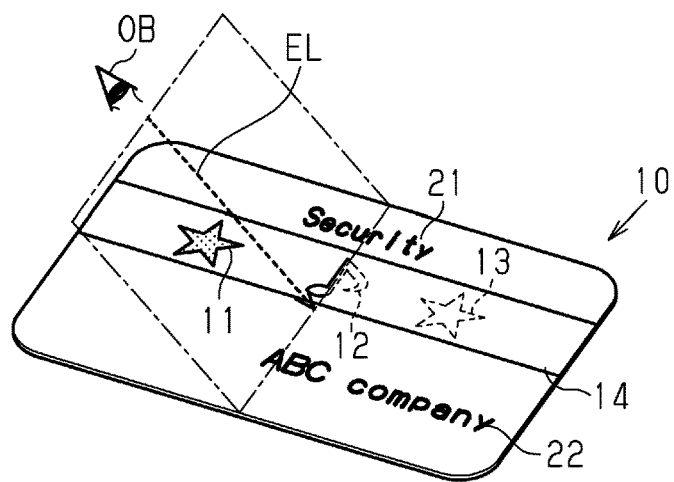
FIG. 13 is a phenomenon diagram for illustrating the working of the display body when the display body in the embodiment is viewed from the second observation point.

As shown in FIG. 13, when the observer OB observes the display body 10 from the second observation point, the light that enters the first display region 34b1 and the first portion b21 of the second display region 34b2 is transmitted by the inclination elements belonging to the display regions. In contrast, the light that enters the second portion b22 of the second display region 34b2 and the third display region 34b3 is totally reflected by the inclination elements belonging to the display regions.

Therefore, the first image 11 with a different color from that of the fourth image 14 displayed by the light interference layer 35 is displayed, and the third image 13 with white color is displayed. Further, a portion of the second image 12 that is displayed by the light transmitted by the first portion b21 is displayed as an image with the color corresponding to the print 36. In contrast, a portion of the second image 12 that is displayed by the light totally reflected by the second portion b22 is displayed as an image with white color instead of the color corresponding to the print 36.

Figure 14:
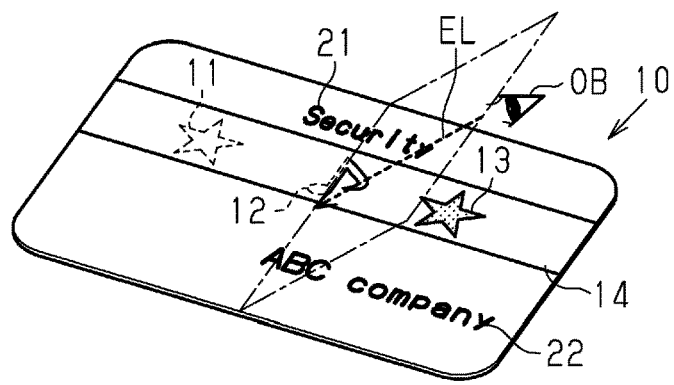
FIG. 14 is a phenomenon diagram for illustrating the working of the display body when the display body in the embodiment is viewed from the third observation point.

As shown in FIG. 14, when the observer OB observes the display body 10 from the third observation point, the light that enters the third display region 34b3 and the second portion b22 of the second display region 34b2 is transmitted by the inclination elements belonging to the display regions. In contrast, the light that enters the first portion b21 of the second display region 34b2 and the first display region 34b1 is totally reflected by the inclination elements belonging to the display regions.

Therefore, the third image 13 with a different color from that of the fourth image 14 displayed by the light interference layer 35 is displayed, and the first image 11 with white color is displayed. Further, a portion of the second image 12 that is displayed by the light transmitted by the second portion b22 is displayed as an image with the color corresponding to the print 36. In contrast, a portion of the second image 12 that is displayed by the light totally reflected by the first portion b21 is displayed as an image with white color instead of the color corresponding to the print 36.

[Manufacturing Method for Display Body]

The formation material for each layer constructing the display body 10 and the formation method for each layer will be described below.

[Prism Layer]

As the formation method for the prism layer 34, a hot embossing method, a cast method, a photopolymer method, and the like can be applied. The photopolymer method is a method that is also called a 2P method or a photosensitive resin method. In these methods, first, in a state where a radiation curable resin is positioned between a replicative mold for replicating the prism layer 34 and a flat base material, the radiation curable resin is irradiated with radiation, and thereby the radiation curable resin is cured. Then, the cured radiation curable resin is separated from the replicative mold together with the base material, and thereby the prism layer having an uneven surface can be obtained.

According to the method using the radiation curable resin, it is possible to obtain a prism layer 34 having a higher accuracy for the shape of the uneven surface and having a higher heat resistance and chemical resistance, compared to methods using thermoplastic resins, as exemplified by the press method and the cast method. As the formation method for the prism layer 34, a method of using a radiation curable resin in a solid state or a high-vicinity liquid state at normal temperature may be applied. In the formation method for the prism layer 34, a mold releasing agent may be added in the resin for forming the prism layer 34.

A variety of materials that can be used as the formation material for the prism layer 34 will be described below. The above-described radiation curable resin and thermoplastic resin both can be applied as the formation material for the prism layer 34.

As the formation material for the prism layer 34, a thermoplastic resin, a thermosetting resin, and a urethane resin can be applied. The thermoplastic resin includes an acrylic resin, an epoxy resin, a cellulose resin, a vinyl resin, a polycarbonate resin, and the like. The thermosetting resin includes a melamine resin, an epoxy resin, a phenol resin, and the like. The urethane resin is a urethane resin obtained by adding polyisocyanate as a crosslinking agent in acrylic polyol, polyester polyol, or the like having reactive hydroxyl groups and performing crosslinking. As the formation material for the prism layer 34, any one of the above-described resins may be used, or two or more of them may be used. Further, resins other than the above-described resins can be used as the formation material for the prism layer 34, if the resins allow the formation of the prism layer 34 having the uneven surface.

When the photopolymer method is used as the formation method for the prism layer 34, a monomer, an oligomer, a polymer, and the like that have an ethylenic unsaturated bond or an ethylenic unsaturated group can be applied as the formation material for the prism layer 34. Among them, the monomer includes 1, 6-hexanediol, neopentylglycol diacrylate, trimethylolpropane triacrylate, pentaerythritol acrylate, pentaerythritol tetraacrylate, dipentaerythritol pentaacrylate, dipentaerythritol hexaacrylate, and the like. The oligomer includes epoxy acrylate, urethane acrylate, polyester acrylate, and the like. The polymer includes a urethane-modified acrylic resin, epoxy-modified acrylic resin, and the like. As the formation material for the prism layer 34, any one of them may be applied, or two or more of them may be applied.

A reactive group may be previously formed in the above described monomer, oligomer, and polymer that have an ethylenic unsaturated bond or an ethylenic unsaturated group. In this case, it is possible to crosslink the monomer, oligomer, and polymer that have an ethylenic unsaturated bond or an ethylenic unsaturated group, with each other or another resin skeleton, using an isocyanate compound, a silane coupling agent, an organic titanate crosslinking agent, an organic zirconium crosslinking agent, an organic aluminate, or the like.

According to such methods, it is possible to obtain a polymer that has an ethylenic unsaturated bond or an ethylenic unsaturated group, exists in a solid state at normal temperature, has a good formability because of a few tacks, and restrains an original form from getting dirty.

Further, when the prism layer is cured using cationic photopolymerization, a compound containing an oxetane skeleton, a vinyl ether, and a monomer, an oligomer, a polymer, and the like that have an epoxy group can be used as the formation material for the prism layer 34.

When the radiation curable resin is cured by light such as ultraviolet light, a photopolymerization initiator can be added in the radiation curable resin. As the photopolymerization initiator, one of a radical photopolymerization initiator, a cationic photopolymerization initiator, and a combination type, a so-called hybrid type of a radical photopolymerization initiator and a cationic photopolymerization initiator can be selected depending on the kind of the radiation curable resin.

The radical photopolymerization initiator includes a benzoin compound, an anthraquinone compound, a phenyl ketone compound, benzyl dimethyl ketal, thioxanthone, acylphosphine oxide, Michler's ketone, and the like. The benzoin compound includes benzoin, benzoin methyl ether, benzoin ethyl ether, and the like.

The anthraquinone compound includes anthraquinone, methyl anthraquinone, and the like. The phenyl ketone compound includes acetophenone, diethoxyacetophenone, benzophenone, hydroxyacetophenone, 1-hydroxycyclohexyl phenyl ketone, α-aminoacetophenone, 2-methyl-1-(4-methylthiophenyl)-2-morpholinopropan-1-one, and the like.

The cationic photopolymerization initiator includes an aromatic diazonium salt, an aromatic iodonium salt, an aromatic sulfonium salt, a mixed ligand metal salt, and the like. As the initiator in which the radical photopolymerization and the cationic photopolymerization are combined, an initiator in which polymerization initiators are mixed can be used. Further, a single initiator having a function to initiate the radical photopolymerization and the cationic photopolymerization may be used, and such an initiator includes an aromatic iodonium salt, an aromatic sulfonium salt, and the like.

The proportion of the radiation curable resin and the photopolymerization initiator may be appropriately set depending on the radiation curable resin and the photopolymerization initiator. Generally, it is preferable that the photopolymerization initiator be added in a range of 0.15 mass % or more and 15 mass % or less with respect to the mass of the radiation curable resin.

In the formation material for the prism layer 34, a sensitizing dye may be added in addition to the photopolymerization initiator. Further, the formation material for the prism layer 34 may contain a dyestuff, a pigment, various additive agents, a crosslinking agent, and the like. The additive agent includes a polymerization inhibitor, a leveling agent, an antifoam agent, a dropping prevention agent, an adhesion improver, a coating surface modifier, a plasticizer, a nitrogen-containing compound, and the like, and the crosslinking agent includes an epoxy resin and the like. Further, a thermoplastic resin, a thermosetting resin, and the like that are unreactive resins in the photopolymerization reaction may be added in the formation material for the prism layer 34, and thereby it is possible to enhance the formability of the prism layer 34.

An inorganic material, an organic material, an organic-inorganic composite fine particle, a hollow particle, and the like may be further added in the formation material for the prism layer 34. In this case, by forming a functional group on the surface of the particle, it is possible to enhance the dispersibility of the particle and the film strength. Further, in the formation material for the prism layer 34, a dispersant for enhancing the dispersibility of the particle, or a surfactant may be added, and a crosslinking agent for enhancing the film strength may be added.

[Light Interference Layer]

As the light interference layer 35, one of a cholesteric liquid crystal layer and a multi-layer interference structure can be used.

[Cholesteric Liquid Crystal Layer]

In the cholesteric liquid crystal, the direction in which liquid crystal molecules extend spirally turns along the thickness direction of the cholesteric liquid crystal layer, and therefore the refractive index periodically vary along the axis of the spiral. Hence, the cholesteric liquid crystal can selectively reflect light with a wavelength corresponding to the period of the spiral. The cholesteric liquid crystal is oriented, and thereby the molecules constituting the cholesteric liquid crystal are arrayed in layers. Therefore, reflected light reflected by the cholesteric liquid crystal constructively strengthens, and thereby the cholesteric liquid crystal layer reflects light having a given color, as a whole.

The color of the light that is reflected by the cholesteric liquid crystal layer varies depending on the angle of the observation of the cholesteric liquid crystal layer. In other words, the color of the light that is reflected by the cholesteric liquid crystal layer and that is visually recognized by the observer OB varies, when the angle to be formed by the cholesteric liquid crystal layer and the plane containing the line-of-sight direction EL of the observer OB fluctuated.

The cholesteric liquid crystal layer in which the liquid crystal molecules are oriented in a given direction can be formed by forming an oriented film on a base material and applying the cholesteric liquid crystal on the oriented film. The oriented film can be formed by performing a rubbing process to a coated layer of polyvinyl alcohol or polyimide. The rubbing process can be performed by rubbing the coated layer using a cotton or a velvet. Further, the liquid crystal molecules can be oriented by applying the cholesteric liquid crystal on the base material while giving shearing force to the cholesteric liquid crystal. Further, the liquid crystal molecules can be oriented by irradiating the cholesteric liquid crystal layer formed on the base material with a polarized laser light or by applying an electrolysis or magnetic field.

The cholesteric liquid crystal layer can be formed by forming a coating film by the application of a liquid crystal solution in which a liquid crystal substance having a nematic structure, a chiral substance, a photo-polymerizable polyfunctional compound, and a photopolymerization initiator are mixed, and irradiating the coating film with ultraviolet light. Instead of the photo-polymerizable polyfunctional compound, a photo-polymerizable monofunctional compound can be used as a formation material for the liquid crystal solution.

At this time, the chiral substance forms a spiral structure by bonding one liquid crystal substance and another liquid crystal substance. Further, photo-polymerizable polyfunctional compounds are cured while being polymerized with each other, so that the cholesteric liquid crystal is fixed. Instead of the liquid crystal substance and the chiral substance, an enantiomer liquid crystal substance having asymmetric carbon atoms in the molecule may be used. Further, the cholesteric liquid crystal layer can be formed also by forming a coating film by the application of a liquid crystal solution in which an enantiomer liquid crystal substance, a photopolymerization polyfunctional compound, and a photopolymerization initiator are mixed, and irradiating the coating film with ultraviolet light.

The cholesteric liquid crystal layer can be formed also by applying the liquid crystal solution on the base material. The cholesteric liquid crystal layer can be formed on the base material also by forming the cholesteric liquid crystal layer on a support different from the base material and thereafter causing the cholesteric liquid crystal layer formed on the support to adhere to the base material together with the support using an adhesive agent, or by transferring the cholesteric liquid crystal layer to the base material.

As the above-described photo-polymerizable polyfunctional compound, a monomer or oligomer that has two or more polymerizable functional groups, polycondensable functional groups, or effective functional groups for polyaddition in the molecule can be used, and two kinds or more of them may be used. As the photo-polymerizable polyfunctional compound, radical photo-polymerizable polyfunctional monomers or radical photo-polymerizable polyfunctional oligomers enumerated below can be used. Further, as the photo-polymerizable monofunctional compound, radical photo-polymerizable monofunctional monomers enumerated below can be applied.

The radical photo-polymerizable polyfunctional monomer includes trimethylolpropane triacrylate, 1,6-hexanediol acrylate, pentaerythritol tetraacrylate, pentaerythritol acrylate, dipentaerythritol hexaacrylate, and the like. Further, the radical photo-polymerizable polyfunctional oligomer includes polyurethane polyacrylate, epoxy resin polyacrylate, acrylic polyol polyacrylate, and the like.

Further, the radical photo-polymerizable monofunctional monomer includes alkyl (having 1 to 18 carbon atoms) (meth)acrylate, benzyl (meth)acrylate, cyclohexyl (meth)acrylate, alkylene (having 2 to 4 carbon atoms) glycol (meth)acrylate, alkoxy (having 1 to 10 carbon atoms), alkyl (having 2 to 4 carbon atoms) (meth)acrylate, polyalkylene (having 2 to 4 carbon atoms) glycol (meth)acrylate, alkoxy (having 1 to 10 carbon atoms) alkyl (having 2 to 4 carbon atoms) (meth)acrylate, polyalkylene (having 2 to 4 carbon atoms) glycol (meth)acrylate, alkoxy (having 2 to 10 carbon atoms) polyalkylene (having 2 to 4 carbon atoms) glycol (meth)acrylate, and the like.

Further, as the photo-polymerizable polyfunctional compound, an aromatic epoxy compound, an alicyclic epoxy compound, and a glycidyl ester compound can be used.

As the photopolymerization initiator, a radical photopolymerization initiator and a cationic photopolymerization initiator can be used. Further, in addition to these photopolymerization initiators, a sensitizer or a peroxide can be used in combination. The radical photopolymerization initiator includes an acetophenone series such as an α-hydroxyacetophenone series or an α-aminoacetophenone series, a benzoin ether series, a benzyl ketal series, an α-dicarbonyl series, an α-acyloxime ester series, and the like.

Specifically, the radical photopolymerization initiator includes α-aminoacetophenone, acetophenone diethyl ketal, benzyl diethyl ketal, α-hydroxycyclohexyl phenyl ketone, 2-hydroxy-2-methylphenylpropanone, benzophenone, Michler's ketone, isopropylthioxanthone, the combination of benzophenone and N-methyldiethanolamine, and the like.

The cationic photopolymerization initiator is preferably applied in combination with the above-described sensitizer or peroxide. The combination of the cationic photopolymerization initiator and the sensitizer or peroxide includes an aryl iodonium salt-α-hydroxyacetophenone series, a triaryl sulfonium salt series, a metallocene compound-peroxide combination series, a metallocene compound-thioxanthone combination series, a metallocene compound-anthracene combination series, and the like.

At the time of the application of the liquid crystal solution in which the liquid crystal substance, the chiral substance, the photopolymerization polyfunctional compound, and the polymerization initiator are mixed, a comma coater, a micro gravure coater offset, and the like can be used. Further, the thickness of the coating film after the application of the liquid crystal solution preferably should be 0.5 µm or more and 20 µm or less, and more preferably should be 2 µm or more and 10 µm or less.

When the coating film is irradiated with ultraviolet light, for restraining the polymerization inhibition by oxygen, the coating film may be irradiated with ultraviolet light, in a state where the oxygen gas concentration in a space for the placement of the coating film is reduced by supplying inert gas such as nitrogen into the space. Alternatively, the coating film may be irradiated with ultraviolet light, in a state where the coating film is covered with a film having an oxygen barrier property. The film having the oxygen barrier property includes a polyvinyl alcohol film.

[Multi-Layer Interference Structure]

The multi-layer interference structure has a construction in which a transparent thin film having a low refractive index and a transparent thin film having a high refractive index are laminated alternately multiple times. Instead of the transparent thin film having a high refractive index, a thin film of metal can be applied.

As the formation material for the transparent thin film, an inorganic dielectric can be applied. The inorganic dielectric includes $AlF_3$ (1.3), $CaF_2$ (1.3 to 1.4), $MgF_2$ (1.4), $SiO_2$ (1.5), $CeF_2$ (1.6), $Al_2O_3$ (1.6), $MgO$ (1.7), $In_2O_3$ (2.0), $ZrO$ (2.0), $ZnO$ (2.1), $Ta_2O_5$ (2.1), $CeO_2$ (2.3), $ZnS$ (2.3), $TiO_2$ (2.5), $CdS$ (2.6), $Fe_2O_3$ (2.7), $Sb_2S_3$ (3.0), and the like. The numerical value in the parenthesis following the chemical formula of each inorganic dielectric is the refractive index of the inorganic dielectric. Further, the thickness of the transparent thin film is nearly the wavelength of light in a visible region. The transparent thin film can be formed by a vapor-phase deposition method such as a vacuum evaporation method.

As the formation material for the transparent thin film, a synthetic resin can be also used. The synthetic resin includes nylon (1.53), polymethyl methacrylate (PMMA) (1.49), polymethylpentene (1.46), fluorine PMMA (1.4), polyethylene naphthalate (1.63), polycarbonate (1.9), polystyrene (1.59), polyethylene terephthalate (1.58), and the like. The numerical value in the parenthesis following the name of each synthetic resin is the refractive index of the synthetic resin. Further, the multi-layer interference structure having the transparent thin film made of the synthetic resin has a shape retaining property, and therefore, in the display body having the multi-layer interference structure, the base material 31 may be excluded.

The light that enters the multi-layer interference structure is repeatedly reflected by reflection surfaces that are interfaces between one thin film and other thin films. Then, the multiply reflected light interferes in the multi-layer interference structure, and thereby light having a given wavelength is emerged as the reflected light, from the multi-layer interference structure. The light other than the light emerged as the reflected light from the multi-layer interference structure is transmitted by the multi-layer interference structure. The color of the light that is reflected by the multi-layer interference structure varies depending on the angle of the observation of the multi-layer interference structure. In other words, the color of the light that is reflected by the multi-layer interference structure and that is visually recognized by the observer varies, when the angle to be formed by the multi-layer interference structure and the plane containing the line-of-sight direction of the observer flacturate.

The light interference layer 35 may be formed by grinding the multi-layer interference structure to form a powdered pearl pigment and printing or applying a coating liquid in which the pearl pigment, a solvent, and a binder are mixed, on the base material.

[Print]

As the formation material for the print 36, a pigment ink, a dyestuff ink, and the like can be used. As the formation method for the print 36, a gravure printing method, a screen printing method, and the like can be applied.

[Base Material]

The base material 31 only needs to be a resin film or resin sheet formed of a synthetic resin. As the formation material for the base material 31, polyethylene terephthalate, polyethylene naphthalate, polycarbonate, and the like can be used. The base material 31 may have a light transmission property, or may have no light transmission property.

EXAMPLE

A transparent polyethylene terephthalate (PET) film having a thickness of 50 μm was prepared as a base material. Then, a $SiO_2$ layer and a $Ta_2O_5$ layer were alternately laminated on the base material, so that a multi-layer interference structure was formed. Next, a print expressing the shape of an eighth note was formed on a part of the light interference layer, by the screen printing using a black ink.

Meanwhile, a photo curable resin (HYPERTECH UR-108N manufactured by Nissan Chemical Corporation) (HYPERTECH is a registered trademark) was used as an ink for a prism layer, and the prism layer was formed using a roll photo polymer method. When the prism layer was formed, first, the ink for the prism layer was applied on a support different from the base material. At this time, the thickness of the coating film to be formed on the support was set to 15 μm. In the application of the ink for the prism layer, the gravure printing method was used.

Then, a cylindrical original form having an uneven shape for forming inclination elements was pressed against the surface of the coating film that is opposite to the surface contacting with the support, under the following condition. That is, the pressing pressure was set to 2 $kgf/cm^2$, the pressing temperature was set to 100° C., the pressing speed was set to 10 m/min, and the original form was pressed against the coating film. While the original form was pressed against the coating film, the support, from the side opposite to the coating film, was irradiated with ultraviolet light having a dose of 300 $J/cm^2$, using a high-pressure mercury lamp. Thereby, while the uneven shape of the original form was transferred to the coating film, the coating film was cured, so that a prism layer having a refractive index of 1.76 was obtained.

A plurality of inclination elements were formed on portions of the second prism surface of the prism layer that correspond to the above-described first display region, second display region, and third display region. In the first display region and the third display region, a plurality of inclination elements were formed such that the inclination angle differs by 1° between inclination elements adjacent to each other in the direction of the array of the inclination elements. Further, a plurality of inclination elements were formed such that the inclination angle differs by 1° between inclination elements that belong to the first portion of the second display region and that are adjacent to each other in the direction of the array of the inclination elements and between inclination elements that belong to the second portion of the second display region and that are adjacent to each other in the direction of the array of the inclination elements. Thereby, a display body in the example was obtained.

When the display body was observed from each of the above-described first observation point, second observation point, and third observation point, it was recognized that the display body displayed the following images. That is, when the display body was observed from the first observation point, it was recognized that the display body displayed the first image with white color, the second image with black color, the third image with white color, and the fourth image with green color.

When the display body was observed from the second observation point, it was recognized that the display body displayed the first image with orange color, the second image configured by a portion with black color and a portion with white color, the third image with white color, and the fourth image with green color.

When the display body was observed from the third observation point, it was recognized that the display body displayed the first image with white color, the second image configured by a portion with black color and a portion with white color, the third image with orange color, and the fourth image with green color.

As described above, the display body according to the embodiment has the following advantages.

(1) When the light enters the air layer 37 from the prism layer 34, it is possible to generate the critical angle θc that is an incidence angle at which the incident light is refracted along the interface. Moreover, in each display region, the inclination angle θ continuously varies among the inclination elements. Therefore, as the angle between the plane along which the display body 10 expand and the plane containing the line-of-sight direction EL of the observer OB fluctuate, the border between inclination elements for which the incidence angle of the incident light is larger than the critical angle θc and inclination elements for which the incidence angle of the incident light is smaller than the critical angle θc of the inclination elements continuously shifts in the array direction DA. Thereby, in each display region, the border between a portion that transmits the light reflected by the light interference layer 35 and a portion that does not transmit the light reflected by the light interference layer 35 continuously shifts, and therefore it is possible to enhance the design of the display body 10.

(2) As the angle between the plane along which the display body 10 expand and the plane containing the line-of-sight direction EL of the observer OB fluctuates, the border between a portion that transmits the light reflected by the light interference layer 35 and a portion that does not transmit the light reflected by the light interference layer 35 can continuously shift between display regions adjacent to each other in the array direction DA. Thereby, it is possible to enhance the artistry of the display body 10.

(3) When the plane containing the line-of-sight direction EL intersects the plane along which the display body 10 expands at an angle other than the perpendicular angle, it is possible to greatly vary the incidence angle for each inclination element of the light that is the incident light to each inclination element and for which the observer OB can visually recognize the reflected light, between the first display region 34*b*1 and the third display region 34*b*3 that are different from each other in the inclination direction of the inclination element.

(4) The inclination direction of the second inclination element b2*t* in the first portion b21 is opposite to the inclination direction of the second inclination element b2*t* in the second portion b22. Therefore, when the plane containing the line-of-sight direction EL intersects the plane along which the display body 10 expands at an angle other than the perpendicular angle, it is possible to greatly vary the incidence angle for each inclination element of the light that is the incident light to the second inclination element b2*t* and for which the observer OB can visually recognize the reflected light, compared to constructions in which the second inclination elements are inclined in the same direction. Hence, it is possible to form two portions different in state, in an image that is formed on one second display region 34b2, and further, it is possible to enhance the design of the display body 10.

Figure 15:
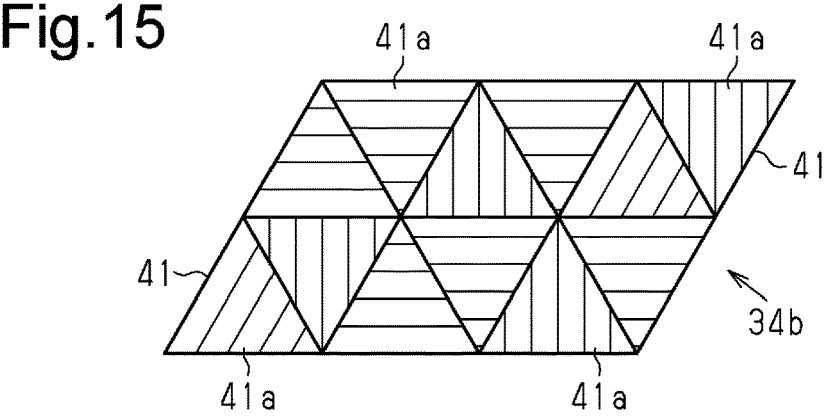
FIG. 15 is a plan view showing the structure of a display region included in a first modification.
Figure 16:
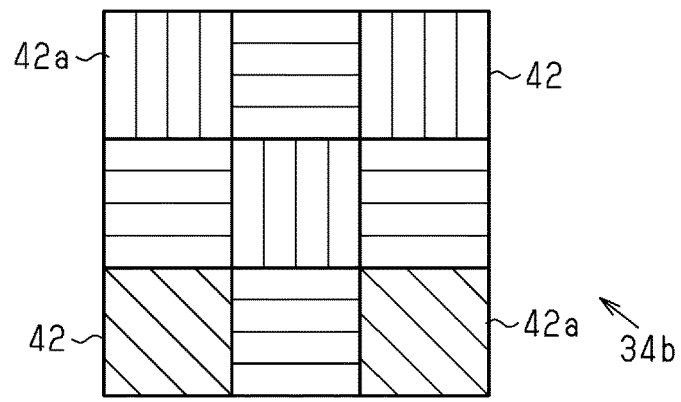
FIG. 16 is a plan view showing the structure of a display region included in a second modification.
Figure 17:
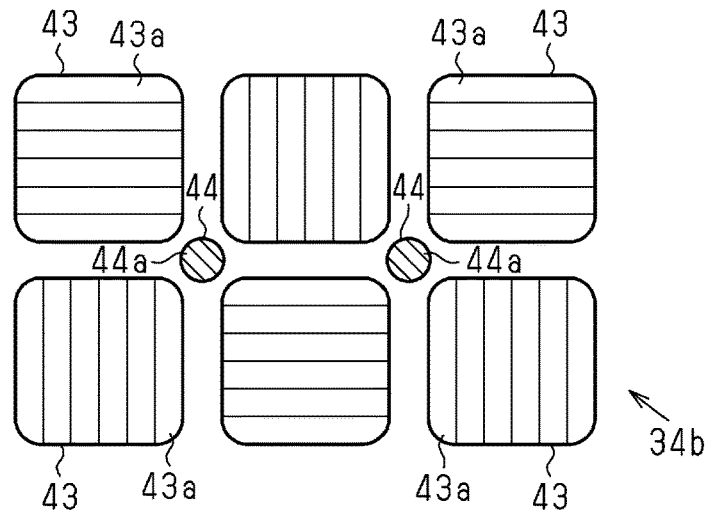
FIG. 17 is a plan view showing the structure of a display region included in a third modification.

The above-described embodiment can be carried out while being appropriately modified as follows. FIG. 15 to FIG. 17 referred to below show plane structures of the display region in a plan view facing the second prism surface 34b of the prism layer 34.

[First Modification]

As shown in FIG. 15, in a plan view facing the second prism surface 34b, each display region 41 has a triangular shape, and on the outer edge of the display region 41, the display region 41 contacts at least one of the other display regions 41. Each display region 41 includes a plurality of inclination elements 41a. Each display region 41 has an array direction specific to the display region 41, and the display regions 41 include display regions 41 that are different from each other in array direction.

Each display region 41 may have another shape, without being limited to a triangular shape.

That is, as shown in FIG. 16, each display region 42 may have a square shape, and on the outer edge of the display region 42, the display region 42 contacts at least two of the other display regions 42. Each display region 42 includes a plurality of inclination elements 42a. Each display region 42 has an array direction specific to the display region 42, and the display regions 42 include display regions 42 that are different from each other in array direction.

In FIG. 15 and FIG. 16, for convenience of illustration, in each display region, the widths of the inclination elements along the array direction are equal to each other. However, similarly to the above-described embodiment, in each display region, the width of each inclination element along the array direction continuously varies as the inclination angle of each inclination element continuously varies along the array direction.

Further, as long as the display regions include at least one display region in which the inclination angle of each inclination element continuously varies along the array direction, the display region may include a display region in which the inclination angle is equal among all the inclination elements belonging to the display region.

Such a configuration has the following advantage.

(5) When the angle to be formed by the plane along which the display body 10 expends and the plane containing the line-of-sight direction EL fluctuate, it is possible to vary, among display regions different from each other in array direction, the state where the border between inclination elements for which the incidence angle is larger than the critical angle θc and inclination elements for which the incidence angle is smaller than the critical angle θc continuously varies. Hence, it is possible to enhance the design of the display body 10, compared to constructions in which the array direction is the same in all the display regions.

[Second Modification]

As shown in FIG. 17, the second prism surface 34b includes a plurality of fourth display regions 43 and a plurality of fifth display regions 44, in a plan view facing the second prism surface 34b. Each fourth display region 43 has a first area, and each fifth display region 44 has a second area that is smaller than the first area, in a plan view facing the second prism surface 34b.

Each fourth display region 43 has a quadrangular shape in which the four corners have a curvature, and each fifth display region 44 has a circular shape. As long as the area of the fourth display region 43 and the area of the fifth display region 44 are different from each other, the shape of the fourth display region 43 and the shape of the fifth display region 44 may be similar to each other.

Further, each fourth display region 43 has an array direction specific to the fourth display region 43, and the fourth display regions 43 include fourth display regions 43 that are different from each other in the array direction of the inclination elements 43a. In contrast, in all the fifth display regions 44, the array directions of the inclination elements 44a are equal to each other.

The array directions of the inclination elements 43a may be equal to each other in all the fourth display regions 43, and the array directions of the inclination element 44a may be equal to each other in all the fifth display regions 44. Further, the fourth display regions 43 may include fourth display regions 43 that are different from each other in the array direction of the inclination elements 43a, and the fifth display regions 44 may include fifth display regions 44 that are different from each other in the array direction of the inclination elements 44a. Furthermore, the array directions may be equal to each other in all the fourth display regions 43, and the fifth display regions 44 may include fifth display regions 44 that are different from each other in the array direction of the inclination elements 44a.

In FIG. 17, for expedience of illustration, in each display region, the widths of the inclination elements along the array direction are equal to each other. However, similarly to the above-described embodiment, in each display region, the width of each inclination element along the array direction continuously varies as the inclination angle of each inclination element continuously varies along the array direction.

Such a configuration has the following advantage.

(6) Between the fourth display region 43 having the first area and the fifth display region 44 having the second area, it is possible to vary the quantity of the light that is emerged from the whole of each display region, due to the difference in the area of the display region. Therefore, it is possible to enhance the design of the display body 10, due to the difference in the quantity of the light that is emerged from the display region, when the angle between the plane along which the display body 10 expands and the plane containing the line-of-sight direction EL varies, compared to configurations in which all the display regions has the same size.

[Third Modification]

Figure 18:
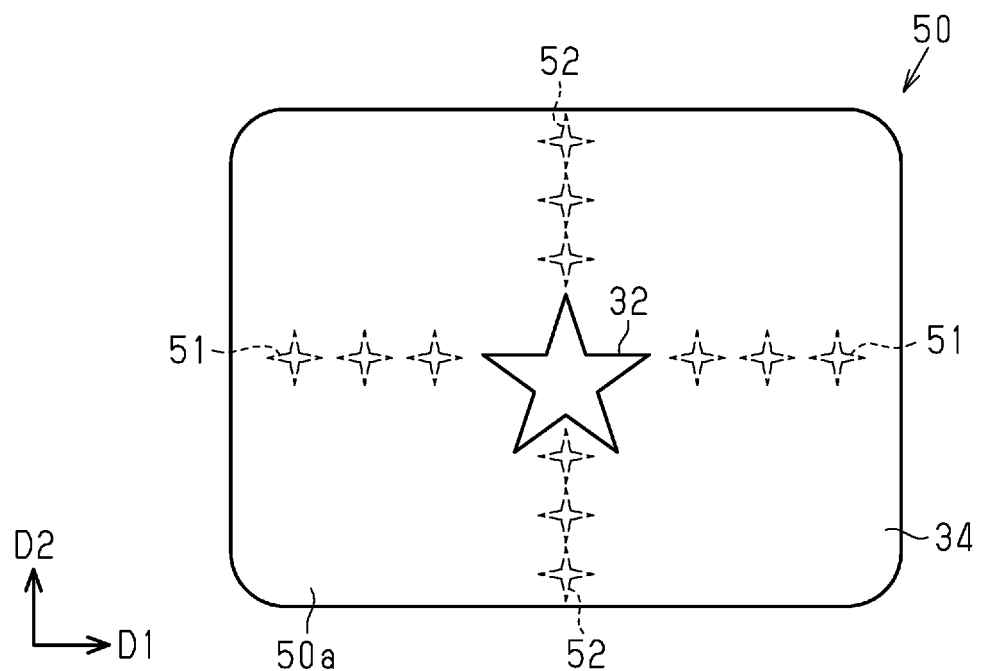
FIG. 18 is a plan view showing the structure of a display body in a fourth modification.

As shown in FIG. 18, a display body 50 includes a prism layer 34 and a print 32 that is transmitted by the prism layer 34. The prism layer 34 has a rectangular plate shape that spreads along a first direction D1 and a second direction D2 orthogonal to the first direction D1, in a plan view facing a surface 50a of the display body 50. The print 32 has a star shape having five vertexes, and is positioned at a portion containing the center of the prism layer 34, in a plan view facing the surface 50a.

The second prism surface 34b of the prism layer 34 includes six sixth display regions 51, and three sixth display regions 51, the print 32, and three sixth display regions 51 are arrayed at intervals along the first direction D1, in a plan view facing the surface 50a. The second prism surface 34b includes six seventh display region 52, and three seventh display regions 52, the print 32, and three seventh display regions 52 are arrayed at intervals along the second direction D2, in a plan view facing the surface 50a. Each sixth display region 51 and each seventh display region 52 have a star shape having four vertexes, in a plan view facing the surface 50a.

In this display body 50, each sixth display region 51 may include a plurality of inclination elements that are arrayed along the first direction D1 and that elongate along the second direction D2. In this case, the inclination angles of the inclination elements may vary by the even angles along the first direction D1 in each sixth display region 51, and the range of the inclination angle of the inclination element may be equal in all the sixth display regions 51. Alternatively, the inclination angle of the inclination element may vary by the even angles along the first direction D1, from the sixth display region 51 positioned at one end in the first direction D1 to the sixth display region 51 positioned at the other end in the first direction D1, over the sixth display regions 51.

On this occasion, each seventh display region 52 may include a plurality of inclination elements that are arrayed along the second direction D2 and that elongate along the first direction D1. In this case, the inclination angles of the inclination elements may vary by the even angles along the second direction D2 in each seventh display region 52, and the range of the inclination angle of the inclination element may be equal in all the seventh display regions 52. Alternatively, the inclination angle of the inclination element may vary by the even angles along the second direction D2, from the seventh display region 52 positioned at one end in the second direction D2 to the seventh display region 52 positioned at the other end in the second direction D2, over the seventh display regions 52.

Further, in the display body 50, each sixth display region 51 and each seventh display region 52 may include a plurality of inclination elements that are arrayed along the first direction D1 and that elongate along the second direction D2. In all the sixth display regions 51, in a plan view facing the surface 50a, the three sixth display regions 51 positioned on one side of the print 32 constitute a single display region group, and the three sixth display regions 51 positioned on the other side of the print 32 constitute a single display region group. Further, in all the seventh display regions 52, in a plan view facing the surface 50a, the three seventh display regions 52 positioned on one side of the print 32 constitute a single display region group, and the three seventh display regions 52 positioned on the other side of the print 32 constitute a single display region group.

In each display region group, the inclination angles of the inclination elements may increase or decrease by the even angles along a direction away from the print 32, from the display region for which the distance from the print 32 is smallest to the display region for which the distance from the print 32 is largest.

According to this configuration, when the angle to be formed by the surface 50a of the display body 50 and the plane containing the line-of-sight direction EL of the observer OB fluctuate, the color of the image to be displayed on each display region varies, and therefore it is possible to enhance the artistry of the display body 50.

Further, each seventh display region 52 may include a plurality of inclination elements that are arrayed along the second direction D2 and that extend along the first direction D1. In all the seventh display regions 52, in a plan view facing the surface 50a, the three seventh display regions 52 positioned on one side of the print 32 constitute a single display region group, and the three seventh display regions 52 positioned on the other side of the print 32 constitute a single display region group. Furthermore, in each display region group, the inclination angles of the inclination element may increase or decrease by the even angles along a direction away from the print 32, from the display region for which the distance from the print 32 is smallest to the display region for which the distance from the print 32 is largest.

[Other Modifications]

The above-described embodiment can be carried out while being appropriately modified as follows.

The difference between the inclination angle $\theta$ of the first inclination element b1$t$ positioned closest to the second display region 34$b$2 in the array direction DA and the inclination angle $\theta$ of the second inclination element b2$t$ positioned closest to the first display region 34$b$1 may be different from the difference in the inclination angle $\theta$ between inclination elements that are adjacent to each other in the array direction DA in each display region. Even in this construction, the above-described advantage (1) can be obtained as long as each display region includes inclination elements that are arrayed in the array direction DA and among which the inclination angles $\theta$ varies by the even angles along the array direction DA.

The difference in the inclination angle $\theta$ between inclination elements that are adjacent to each other in the array direction DA may differ for each of the display regions. Even in this configuration, the above-described advantage (1) can be obtained as long as each display region includes a plurality of inclination elements that are arrayed in the array direction DA and among which the inclination angles $\theta$ varies by the even angles along the array direction DA.

The second prism surface 34$b$ may have a configuration including only one or only two of the first display region 34$b$1, the second display region 34$b$2, and the third display region 34$b$3. Even in this configuration, the above-described advantage (1) can be obtained as long as each display region includes inclination elements that are arrayed in the array direction DA and among which the inclination angles $\theta$ vary by the even angles along the array direction DA.

The inclination element is a flat surface that forms a given inclination angle $\theta$ with the plane along which the prism layer 34 expands, but the inclination element may have a curved surface. In this configuration, the angle to be formed by a plane resulting from approximating the curved surface as the inclination element and the plane along which the prism layer 34 expends is the inclination angle $\theta$ of each inclination element. Further, in a display region including curved inclination elements, the inclination angles $\theta$ only needs to vary by the even angles, along a direction in which the inclination elements are arrayed. Even in this configuration, an advantage equivalent to the above-described advantage (1) can be obtained.

In each of the first display region 34$b$1 and the third display region 34$b$3, the inclination angles $\theta$ of respective inclination elements may increase by the even angles along the array direction DA, among a plurality of inclination elements that are some of all the inclination elements included in each display region. Even in this construction, an advantage equivalent to the above-described advantage (1) can be obtained in a part of each display region.

As the interface layer, the display body may include, for example, a layer formed of a resin, instead of the air layer. In this construction, the interface layer only needs to be formed of a resin having a lower refractive index than the resin forming the prism layer 34.

The display body may include a cover layer that is positioned on the first prism surface 34$a$ of the prism layer 34. In this configuration, the refractive index of the cover layer be lower than the refractive index of the prism layer 34 preferably. Thereby, when the light enters the prism layer 34 from the cover layer side, the critical angle is not occurred between the cover layer and the prism layer 34, and therefore it is possible to increase the quantity of the light that is transmitted by the prism layer 34 from the cover layer.

The invention claimed is:

1. A display body comprising:
a light interference layer that incident light enters at an incidence angle and that emerge reflected light, the incident light having a certain wavelength range, the reflected light having a given wavelength which is a part of the certain wavelength range, the given wavelength according to the incidence angle;
a prism layer spreading along a first plane and having optical transparency that transmits the incident light to the light interference layer, the prism layer having an uneven surface that includes at least one display region; and
an interface layer that is adjacent to the prism layer, a refractive index of the prism layer being higher than a refractive index of the interface layer, wherein
the display region includes a plurality of inclination elements, the inclination elements being inclined at predetermined angles with respect to the first plane, the inclination elements being arrayed in an array direction along an array axis in the first plane and extending in an extending direction along an extending axis orthogonal to the array axis in the first plane, the inclination elements adjacent to each other in the array direction contact each other in a plan view facing the first plane, and
the inclination elements include a plurality of first inclination elements among which the inclination angle increases by a constant angle along the array direction.

2. The display body according to claim 1, wherein
the uneven surface includes a plurality of the display regions that are arrayed at intervals in the array direction, and
between the display regions adjacent to each other, the inclination angle of the inclination elements adjacent to each other increases by the constant angle along the array direction.

3. The display body according to claim 1, wherein
the uneven surface includes a plurality of the display regions that are arrayed in the array direction,
a plane orthogonal to the first plane and parallel to the extending direction is a reference plane, and
the display regions include a first display region in which all the inclination elements are inclined in a first array direction with respect to the reference plane and a second display region in which all the inclination elements are inclined in a second array direction with respect to the reference plane, the first array direction being a direction along the array axis, the second array direction being a direction opposite to the first array direction.

4. The display body according to claim 1, wherein
at least one of the display regions is constructed by a first portion and a second portion that are arrayed in the array direction,
a plane orthogonal to the first plane and parallel to the extending direction is a reference plane, and
all the inclination elements belonging to the first portion are inclined in a first array direction with respect to the reference plane and all the inclination elements belonging to the second portion are inclined in a second array direction, the first array direction being a direction along the array axis, the second array direction being a direction opposite to the first array direction.

5. The display body according to claim 1, wherein
the uneven surface includes a plurality of the display regions,
each of the display regions has an array direction specific to the display region, and
the display regions include the display regions that are different from each other in the array direction.

6. The display body according to claim 1, wherein
the uneven surface includes a plurality of the display regions, and
the display regions include, in a plan view facing the first plane, the display region having a first area and the display region having a second area different from the first area.

7. The display body according to claim 1,
wherein the display region has a shape in which a cross-section continues in one direction, the cross-section having a triangular wave shape in which triangular shapes are consecutively formed in an advance direction, and an inclination of a wave shape increases by a constant angle along the advance direction.

* * * * *